United States Patent [19]

Lew

[11] Patent Number: 4,730,491

[45] Date of Patent: Mar. 15, 1988

[54] MAGNETICALLY ACTIVATED MULTIPLE SWITCH LEVEL DETECTOR

[76] Inventor: Hyok S. Lew, 7890 Oak St., Arvada, Colo. 80005

[21] Appl. No.: 913,100

[22] Filed: Sep. 29, 1986

[51] Int. Cl.[4] .................. G01F 23/62; H01H 35/18
[52] U.S. Cl. ...................................... 73/308; 73/313; 200/84 C
[58] Field of Search .................. 73/308, 313, DIG. 5; 200/84 C; 335/206; 340/624

[56] References Cited

U.S. PATENT DOCUMENTS

| | | | |
|---|---|---|---|
| 3,678,750 | 7/1972 | DiNoia | 73/313 |
| 3,976,963 | 8/1976 | Kubler | 73/313 X |
| 4,056,979 | 11/1979 | Bongort et al. | 73/313 |
| 4,384,184 | 5/1983 | Alvarez | 73/313 X |
| 4,567,762 | 2/1986 | Hoppert et al. | 73/313 X |
| 4,627,283 | 12/1986 | Nishida et al. | 73/313 |
| 4,628,162 | 12/1986 | Reinartz et al. | 73/313 X |

Primary Examiner—Daniel M. Yasich

[57] ABSTRACT

This invention discloses a linear position detector including a pair of elongated electrically conducting members disposed in a parallel arrangement and a plurality of magnetically activated normally open switches disposed at regular intervals following the lengthwise direction of the two elongated electrically conducting members, wherein each of the magnetically activated normally open switches provides electrical connection between the two elongated electrically conducting members when the magnetically activated normally open switch is closed. The combination of the two electrically conducting members and the plurality of the magnetically activated normally open switches are enclosed within a sealed elongated tubular container. A float including at least one magnet is secured to the sealed elongated tubular container in a sliding relationship. The position of the float is determined from the ohmic resistances of two electrical circuits respectively comprising two portions of the two electrically conducting members divided by the float and one or more of the magnetically activated normally open switches closed by the magnetic force of the float, wherein the position of the float is determined independent of the ohmic resistance contributed by one or more of the magnetically activated switches closed by the magnet in the float.

6 Claims, 14 Drawing Figures

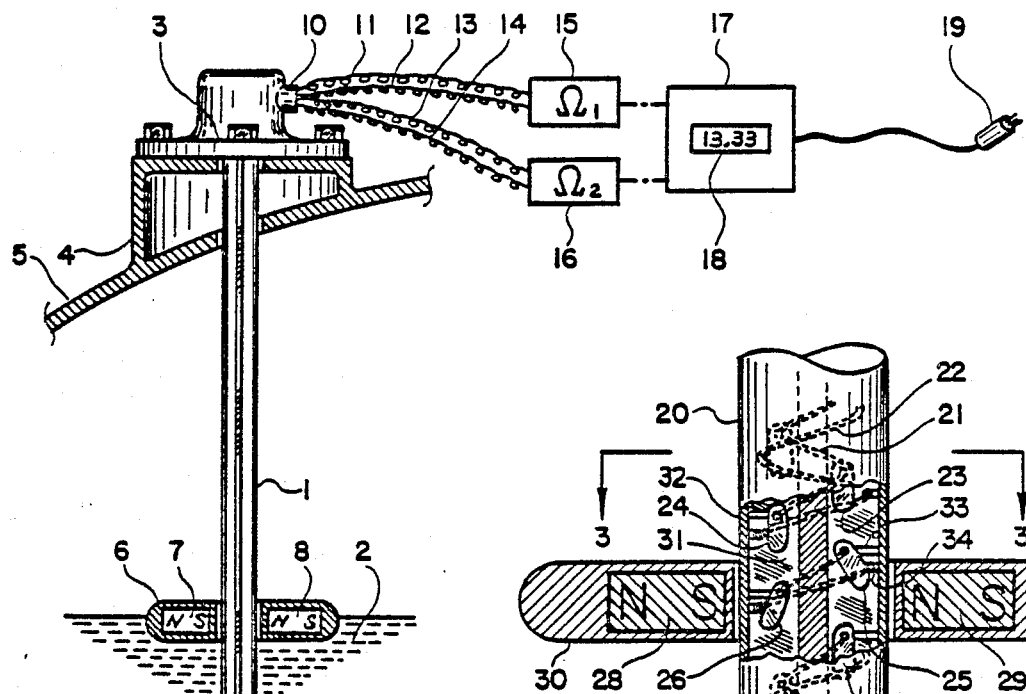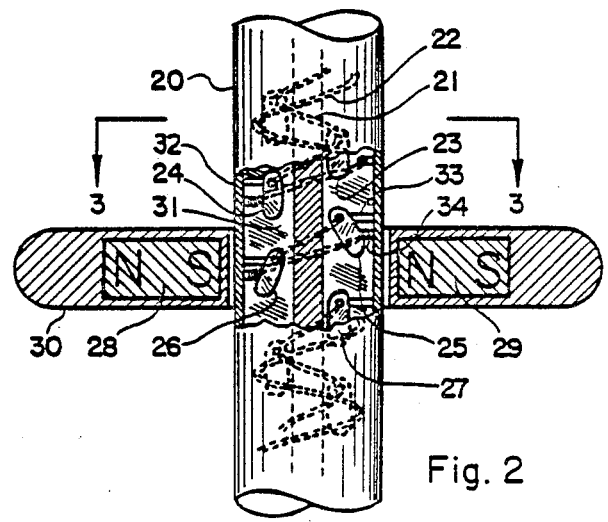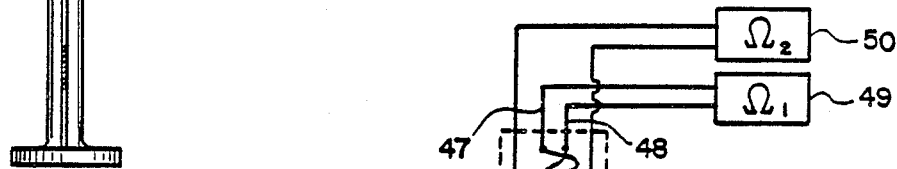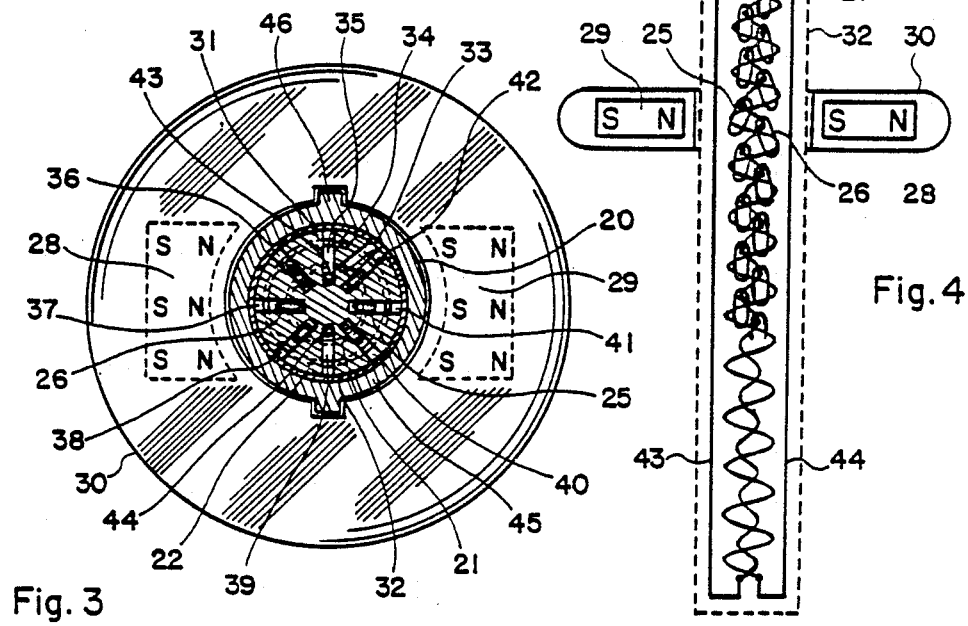
Fig. 1
Fig. 2
Fig. 3
Fig. 4

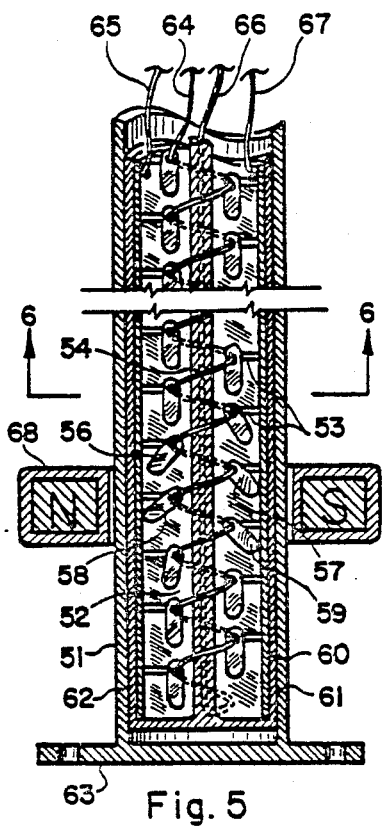
Fig. 5
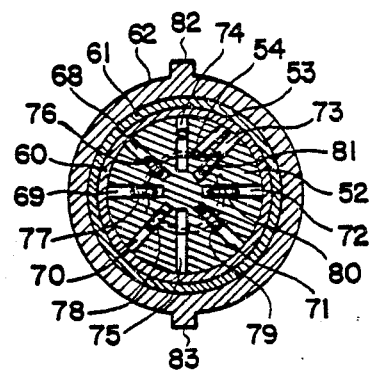
Fig. 6
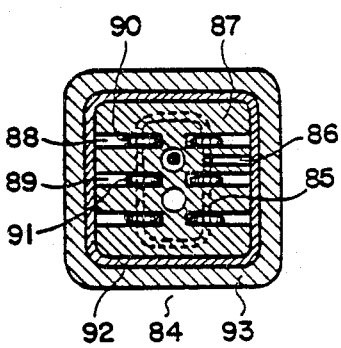
Fig. 7
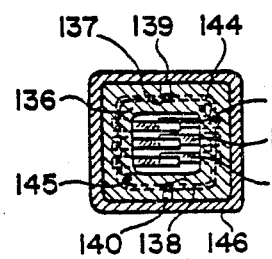
Fig. 9
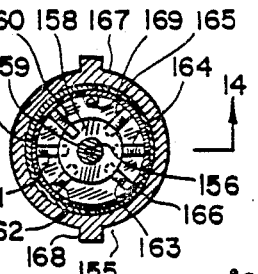
Fig. 10
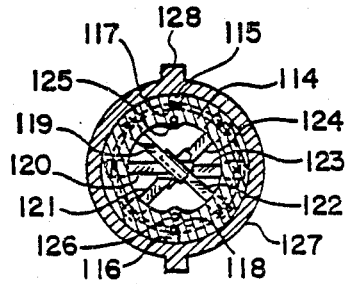
Fig. 11
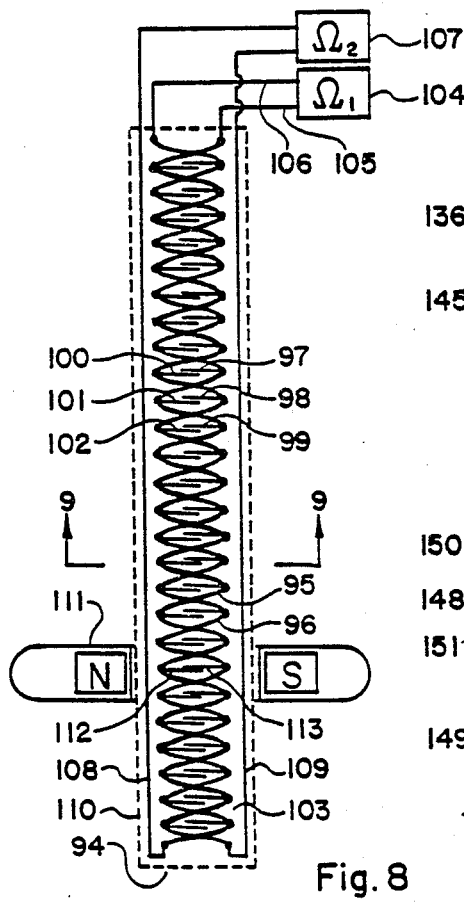
Fig. 8
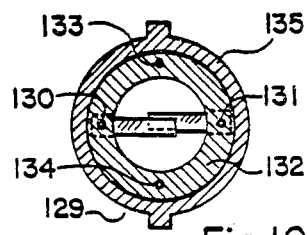
Fig. 13
Fig. 12
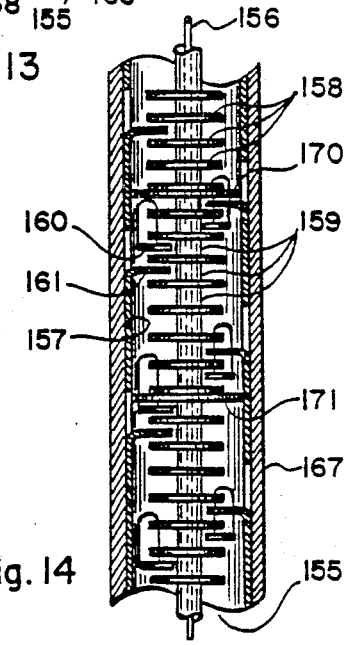
Fig. 14

MAGNETICALLY ACTIVATED MULTIPLE SWITCH LEVEL DETECTOR

BACKGROUND OF THE INVENTION

There is a strong demand in the industry for a level sensing device that detects the fluid level in a continuous manner in a simple and reliable method. The ultimate level sensor must detect the fluid level in a continuous manner and must have its functioning element completely sealed off from the fluid and the ambient surroundings. This ultimate level sensor must be inexpensive to purchase, install and maintain, and be highly reliable in operation. The existing level sensors detecting the fluid level in a continuous mode are rather expensive or unreliable or prone to fouling by the fluid or ambient surroundings. Consequently, the processing industries are still looking for the perfect level sensor.

SUMMARY OF THE INVENTION

The primary object of the present invention is to provide a position-sensing device including two elongated electrically conducting members disposed adjacent to one another and a plurality of the magnetically activated switches disposed therebetween following the length of the two elongated conducting members, wherein these magnetically activated switches stay normally open except one or a few thereof which are closed by the magnetized float or marker sliding along the length of the two elongated conducting members.

Another object is to provide a position-sensing device wherein the position of the magnetized float or marker is determined from ohmic resistance between the first extremities of the two elongated electrically conducting members and the ohmic resistance of the second extremities of the two elongated electrically conducting members.

A further object is to provide a position-sensing device wherein the combination of the two elongated electrically conducting members and the plurality of the magnetically activated switches are packaged within sealed elongated tubular container.

Yet another object is to provide a position-sensing device wherein the detection of the position of the float or marker is independent of the contact ohmic resistance originating from the magnetically activated switches.

Yet a further object is to provide a position-sensing device operating in all positions including the vertical as well as the horizontal positions and all other positions therebetween.

Still another object is to provide a position-sensing device that is highly reliable and inexpensive.

Still a further object is to provide a position-sensing device which is a genuine candidate for the perfect level sensor sought after by the processing industries.

These and other objects of the present invention will become clear as the description thereof proceeds.

BRIEF DESCRIPTION OF THE FIGURES

The present invention may be described with a great clarity and specificity by referring to the following figures:

FIG. 1 illustrates the general arrangement of the position-sensing device constructed in accordance with the principles of the present invention.

FIG. 2 illustrates a partially cut-out view of an embodiment of the transducer portion of the position-sensing device such as that shown in FIG. 1.

FIG. 3 illustrates a cross section of the combination illustrated in FIG. 2.

FIG. 4 illustrates a schematic drawing showing the structure of the position-sensing device illustrated in FIGS. 2 and 3.

FIG. 5 illustrates another embodiment of the transducer portion of the position-sensing device operating on the same principles as those shown in FIG. 4.

FIG. 6 illustrates a cross section of the combination shown in FIG. 5.

FIG. 7 illustrates a cross section of a further embodiment of the transducer portion of the position-sensing device operating on the same principles as those illustrated in FIG. 4.

FIG. 8 illustrates a schematic drawing showing the structure of another position-sensing device constructed in accordance with the principles of the present invention.

FIG. 9 illustrates a cross section of the embodiment of the position-sensing device illustrated in FIG. 8.

FIG. 10 illustrates a cross section of another embodiment of the position-sensing device having a construction similar to that shown in FIG. 8.

FIG. 11 illustrates a cross section of a further embodiment of the position-sensing device having a construction similar to that shown in FIG. 8.

FIG. 12 illustrates a cross section of yet another embodiment of the position-sensing device operating on the same principles as those illustrated in FIG. 8.

FIG. 13 illustrates a cross section of yet a further embodiment of the position-sensing device operating on the same principles as those illustrated in FIG. 8.

FIG. 14 illustrates another cross section of the embodiment shown in FIG. 13.

DESCRIPTION OF THE ILLUSTRATED EMBODIMENTS

In FIG. 1, there is illustrated the general arrangement of the position-sensing device of the present invention, which embodiment is for measuring the fluid level. This embodiment of the position-sensing device includes an elongated transducer assembly or rod container 1 partially submerged in the fluid medium 2, that is supported by a flange 3 included in one extremity thereof. The supporting flange 3 is secured to a flange 4 affixed to the reservoir vessel wall 5. The elongated transducer rod 1 extending from the supporting flange or securing means 3 extends through the reservoir vessel wall 5 into the interior thereof in a leak proof manner. The elongated transducer rod 1 is engaged by a float or position marker 6 including a plurality of magnets 7 and 8 in a sliding relationship. The stop 9 included in the submerged extremity of the elongated transducer rod 1 prevents the float 6 from sliding off therefrom. The outlet conduit 10 included in the other extremity of the elongated transducer rod 1 provides a routing for four electric cables 11, 12, 13 and 14 extending therefrom. The electric cables 11 and 12 are connected to a first ohmic resistance measuring device 15 that measures the ohmic resistance between the electric cables 11 and 12. The electric cables 13 and 14 are connected to second ohmic resistance measuring device 16 measuring the ohmic resistance between the electric cables 13 and 14. The data processor 17 converts the ohmic resistances measured by the devices 15 and 16 into data related to the position of the float or marker 6, wherein the output is displayed by a data display 18 or transmitted by a terminal 19 to other processors or controllers.

In FIG. 2 there is illustrated a partially cut-out view of an embodiment of the transducer rod 20 usable in place of the element 1 shown in FIG. 1. The transducer rod 20 includes a first electrically conducting wire 21 disposed in a helical pattern following the length of the transducer rod 20 and a second electrically conducting wire 22 disposed in another helical pattern in a configuration parallel to the first conducting wire 21, wherein the helical pattern of the second wire 22 has a pitch diameter greater than that of the helical pattern of the first conducting wire 21 while both conducting wires are disposed at the same pitches. The first conducting wire 21 includes a plurality of pendulous members 23, 24, 25, 26, 27, etc. made of electrically conducting and magnetically permeating material, which are disposed following the first conducting wire 21 at regular intervals and pendulously secured to the first conducting wire 21. The pendulous members hanging loosely from the first conducting wire 21 and suspended in a vertical position by the pull of the earth's gravitational pull are separated from the second conducting wire 22 in a surrounding free of any magnetic field. However, the pendulous members 25 and 26 located in the path of the magnetic flux of the magnets 28 and 29 included in the float 30 tend to pivot to a position as parallel as possible to the line of the magnetic flux. In other words, the magnets 28 and 29 included in the float 30 pull the pendulous members 25 and 26 untill they come to contact with the second conducting wire 22. Here, it should be noticed that the length of the pendulous members is long enough whereby the pivoting motion of the pendulous members created by the magnets and stopped by the contact with the second conducting wire 22 are limited to an angle substantially less than 180 degrees. In actual construction providing the arrangement shown in FIG. 2, a dielectric rod 31 enclosed within an elongated tubular container 32 is employed. The dielectric rod 31 includes a first helical groove 33 with a smaller pitch diameter that receives the first conducting wire 21 and a second helical groove 34 with a larger pitch diameter that receives the second conducting wire 22. The dielectric rod 31 further includes a plurality of axial grooves disposed in an axisymmetric pattern as shown in FIG. 3, which axial grooves receive the pendulous switch members 23, 24, 25, 26, 27, etc.

In FIG. 3 there is illustrated a cross section of the transducer rod 20 taken along a plane 3—3 perpendicular to the central axis of the transducer rod 20 as shown in FIG. 2. The dielectric rod 31 includes the first helical groove 33 of a smaller pitch diameter receiving the first conducting wire 21 and the second helical groove 34 of a larger pitch diameter receiving the second conducting wire 22. The dielectric rod 31 further includes a plurality of axial grooves 35, 36, 37, 38, 39, 40, 41, 42, etc. disposed axisymmetrically, which axial grooves penetrate beyond the first helical groove 33. The plurality of the pendulous switch members 25, 26, etc. pivotally suspended from the first conducting wire 21 are respectively disposed within the axial grooves 37, 41, etc. The axial grooves 35 and 39 are reserved for the routing of the return wires 43 and 44, respectively. The dielectric rod 31 including the combinations of the two conducting wires 21 and 22, and the plurality of the pendulous switch members suspended from the first conducting wire 21 is enclosed within an elongated tubular container 32, which may be a metallic tubing or pipe providing structural rigidity to the assembly. It should be understood that the pendulous switch members brought to a contact with the second conducting wire 22 by the magnets 28 and 29 included in the float 30 are not allowed to touch the tubular container 32 when it is of a metalic tubing or pipe. The elongated tubular container 32 may be enclosed within a hollow plastic cylinder 45 having at least one guide key 46 that prevents the float 30 from rotating relative to the transducer rod 20 while allowing sliding movements relative thereto, which helps to maintain the direction of the magnetic flux in a proper orientation that activates the pendulous switch members in the most effective way. Of course, the hole included in the float 30 forr engaging the transducer rod 20 must have provisions such as keyway for receiving the guide key 46.

In FIG. 4, there is illustrated a schematic drawing showing the structure of the level-sensing device shown in FIGS. 2 and 3. The two conducting wires 21 and 22 disposed in two helical patterns in a parallel configuration are enclosed within the elongated tubular container 32 that is hermetically sealed. The float 30 including magnets 28 and 29 is engaged by the elongated tubular container 32 in a sliding relationship. The pendulous switch 25, 26, etc. are pendulously secured to the first conducting wire 21. The first extremities of the two conducting wires 21 and 22 are connected to a first ohm meter 49 by a pair of connecting wires 47 and 48, respectively, while the second extremities of the two conducting wires 21 and 22 are connected to a second ohm meter 50 by a pair of return connecting wires 43 and 44, respectively. In the arrangement shown in FIG. 4, at least one of the two conducting wires 21 and 22 must have high specific ohmic resistance and the pendulous switch members must be made of electrically conducting and magnetically permeating material. It is desirable to construct the pendulous switch members of ferromagnetic metal while the conducting wires 21 and 22 are made of nonferromagnetic materials.

It can be easily shown that the ratio of the distance h from one end of the transducer rod to the float to the distance $h_o$ between the two ends of the transducer rod is given by the equation $$\frac{h}{h_o} = \frac{\Omega_1 - \Omega_2 - A}{B} + \frac{1}{2},$$

where $\Omega_1$ and $\Omega_2$ are the ohmic resistances respectively measured by the ohmic meters 49 and 50, A is a constant parameter determined by the ohmic resistance associated with the connecting wires 43, 44, 47 and 48, and B is a constant parameter determined by the specific ohmic resistance of the high ohmic resistance wires 21 and 22. Of course, the numerical values of A and B can be experimentally determined by finding the values of $\Omega_1$ and $\Omega_2$ for two different known values of h. The aforementioned equation determines the relative position of the float from the measured value of the ohmic resistance provided by the ohm meters 49, and 50, respectively. Of course, the relative position of the float determined by the aforementioned method can be converted to other physical quantities by a data processor that uses $\Omega_1$ and $\Omega_2$ as input. It should be noticed that, in the present method of detecting fluid level by using the level-sensing device shown in FIG. 4, the ohmic resistance associated with the pendulous switch members are not involved and, consequently, the fluid level is detected with a high accuracy independent of the physical condition of the pendulous switch members as long as those pendulous switch members provide a pair of electrical circuits respectively analized by the two ohm meters 49 and 50.

In FIG. 5 there is illustrated another embodiment of the transducer rod 51 operating on essentially the same principles as those described in conjunction with FIG. 4. The transducer rod 51 comprises a dielectric rod 52 including a single helical groove 53 that receives a high ohmic resistance electrically conducting wire 54, and a plurality of axial grooves disposed in an axisymmetric pattern about the central axis of the dielectric rod 52, which axial grooves disposed in the same manner as those elements 35-42 shown in FIG. 3, respectively receive a plurality of the pendulous switch members 56, 57, 58, 59, etc. disposed at regular intervals following the high ohmic resistance conducting wire 54 and pivotably suspended therefrom while maintaining an electrically conducting contact therewith at all instances. Of course, the pendulous switch members are made of electrically conducting and magnetically permeating metal. The dielectric rod 52 including the conducting wire 54 and the pendulous switch members 56, 57, 58, 59, etc. is enclosed within a hermetically sealed hollow cylinder 60 made of nonferrous electrically conducting material such as copper, aluminum, bronze, brass or stainless steel. The hollow metallic cylinder 60 housing the dielectric rod 52 is electrically insulated by an insulating liner or covering 61. The completed assembly of the transducer rod is sealed in a metallic or plastic tubular container 62 that may include a flanged extremity 63 for anchoring the submerged extremity thereof to the bottom of the reservoir vessel. One extremity of the high ohmic resistance wire 54 and the conducting hollow cylindrical container 60 are connected to a first ohm meter (not shown) by a pair of connecting wires 64 and 65, respectively, while the other extremity of the high ohmic resistance wire 54 and the conducting hollow cylindrical container 60 are connected to a second ohm meter (not shown) by the return connecting wire 66 connected to the other extremity of the high ohmic resistance wire 54 and the connecting wire 67 connected to the conducting hollow cylindrical container 60. The magnetized float 68 pivoting the pendulous switch members in the immediate vicinity thereof establish a localized electrical contact between the high ohmic resistance wire 54 and the electrically conducting hollow cylindrical container 60. The position of the float 68 relative to the distance between the two extremities of the transducer rod 51 is determined by the formular described in conjunction with FIG. 4 when the ohmic resistances of the two electrical circuits established by the pendulous switch members activated by the magnets in the float are measured.

In FIG. 6 there is illustrated a cross section of the embodiment of the transducer rod 51 of FIG. 5 taken along plane 6—6 perpendicular to the central axis of the transducer rod 51 as shown in FIG. 5. The helical groove 53 included in the dielectric rod 52 receives the high ohmic resistance wire 54 disposed in a helical pattern coaxially following the central axis of the dielectric rod 52, while the plurality of the axial grooves 68, 69, 70, 71, 72, 73, etc. disposed in a radial pattern in the cross section respectively receive the pendulous switch members 76, 77, 78, 79, 80, 81, etc. in a pivotable relationship, which pendulous switch members disposed at regular intervals following the high ohmic resistance wire 54 are pivotably suspended from the high ohmic resistance wire 54 while maintaining an electrical contact therewith at all instances. The dielectric rod 52 is contained within the electrically conducting tubular member 60, that is insulated by the insulating layer 61 on the outer cylindrical surface, wherein the entire combination is hermetically sealed within the elongated tubular container 62 including one or more guide keys 81 and 82 which guide the sliding movement of the magnetized float 68 in an orientation wherein the pendulous switch members are most readily pivoted by the magnets included in the float 68. Those axial grooves 74 and 75 positioned unfavorably in terms of the direction of the magnetic flux created by the magnets in the float 68 are used to route the return connecting wire 66 or left unused.

In FIG. 7 there is illustrated a cross section of a further embodiment of the transducer rod taken along a plane perpendicular to the central axis of the transducer rod. The transducer rod 84 is constructed in essentially the same ways as the embodiment shown in FIGS. 5 and 6 with one exception being that the assembly comprising essentially the same elements are packaged in a rectangular cross section in place of the circular cross section. The high ohmic resistance wire 85 is disposed in a helical pattern of a rectangular cross section following a helical groove 86 included in a dielectric rod 87 of a rectangular cross section. The axial grooves 88, 89, etc. receiving the pendulous switch member 90, 91, etc. suspended from the high ohmic resistance wire 85 are disposed in a parallel configuration instead of the radial pattern. The electrically conducting rectangular tubing 92 with a significant wall thickness provides the other half of the two electrical circuits wherein the high ohmic resistance wire 85 provides one half thereof. It also provides the structural rigidity for the assembly. The complete assembly of the transducer rod is enclosed within a sealed rectangular plastic tubing 93, which combination eliminates the need of the outer metallic tubular container such as the element 62 shown in FIG. 5. Naturally the magnetized float (not shown) slidably engaged by the transducer rod 84 has a rectangular hole receiving the transducer rod 84, which helps to keep the magnetic flux in a direction substantially parallel to the pattern of the axial grooves 88, 89, etc. in the cross section. It is clear that a transducer rod operating on principles similar to those described in conjunction with FIGS. 4, 5, 6 and 7 may be packaged in cross sections different from those shown in the illustrated embodiments in a different structural arrangement without departing from the operating principles thereof.

In FIG. 8 there is illustrated a schematic drawing showing the structure of a level-sensing device operating on another principle taught by the present invention. The level-sensor device 94 comprises a pair of electrically conducting wires 95 and 96 disposed parallel to one another in a helical pattern wherein the helical windings of the two conducting wires are parallel windings. At least one of the two electrically conducting wires is a high ohmic resistance wire. Two sets of a plurality of thin strips or reed switches made of electrically conducting and magnetically permeating material 97, 98, 99, etc. and 100, 101, 102, etc. are respectively disposed at regular intervals following the two conducting wires 95 and 96, wherein the thin strips or reed switches with one extremity under an electrical contact with one of the two conducting wires 95 and 96 extend radially toward and beyond the central axis of the transducer rod 103 in a spaced and over-lapping configuration. The first extremities of the two conducting wires 95 and 96 are connected to a first ohm meter 104 by a pair of connection wires 105 and 106, respectively. The other extremities of the conducting wires 95 and 96 are connected to a second ohm meter 107 by a pair of return connection wires 108 and 109. The assembly comprising the two conducting wires, plurality of the reed switches and the pair of return connecting wires is packaged in a sealed elongated tubular container 110, which slidably engages a magnetized float 111. The magnetic flux across the transducer rod 103 closes at least one pair of reed switches in the immediate vicinity of the magnetized float 111 such as the elements 112 and 113 and, thus establishes a localized electrical connection between the two conducting wires 95 and 96, which provides two electrical circuits having over-all ohmic resistances equal to $\Omega_1$ and $\Omega_2$, respectively, which are measured by the two ohm meters 104 and 107. The position of the magnetized float 111 relative to the distance between the two ends of the transducer rod 103 is determined by essentially the same equation as that described in conjunction with FIG. 4.

In FIG. 9 there is illustrated a cross section showing the actual structure of a transducer rod constructed in accordance with and operating on the principles described in conjunction with FIG. 8 which cross section is taken along plane 9—9 as shown in FIG. 8. A dielectric hollow bar 114 includes two parallel helical grooves 115 and 116 disposed following the outer cylindrical surface of the hollow bar 114 made of dielectric material, which helical grooves respectively receive the two conducting wires 117 and 118 disposed in helical patterns. A plurality of flexible members or reed switches 117, 118, 119, 120, 121, 122, etc. disposed at regular intervals with one extremity under electrical contact with one of the two conducting wires 117 and 118 wherein those extremities of the reed switches are secured to the bottom of one of the two helical grooves 115 and 116, extends inwardly in a radial pattern beyond the central axis of the dielectric hollow bar 114 in a spaced and over-lapping configuration. The return connection wires 125 and 126 respectively extending from the other extremities of the conducting wires 117 and 118 are routed through two axial holes disposed in the dielectric hollow bar 114. The dielectric hollow bar 114 including the two conducting wires, the plurality of reed switches and the pair of return connection wires is enclosed within a sealed tubular housing 127 including at least one guide key 128, which guides the magnetized float in a sliding and nonrotating relationship.

In FIG. 10 there is illustrated a cross section of another embodiment of the transducer rod having a construction similar to that illustrated in FIG. 9. The transducer rod 129 includes a pair of conducting wires 130 and 131 which are routed in holes disposed through the dielectric hollow bar 132 in the axial direction. A plurality of reed switches with one extremity in contact with one of the two conducting wires 130 and 131 and secured to the dielectric hollow bar 132 extend inwardly beyond the central axis of the dielectric hollow bar 132 in a spaced and over-lapping configuration. A pair of return connection wires 133 and 134 respectively extending from the other extremities of the two conducting wires 130 and 131 are also routed in holes disposed through the dielectric hollow bar 132 in axial direction. The dielectric hollow bar 132 including the combinations of the two conducting wires, the plurality of reed switches and the pair of return connection wires is enclosed within a sealed tubular housing 135 which may be made of metallic or nonmetallic material. It is quite clear that the embodiment shown in FIG. 10 is a simplified version of the embodiment shown in FIG. 9, wherein the former has less degree of resolution than the latter.

In FIG. 11 there is illustrated a cross section of a further embodiment of the transducer rod taken along a plane perpendicular to the central axis of the transducer rod. The dielectric rectangular tubing 136 includes a pair of electrically conducting wires 137 and 138 disposed in a parallel helical winding following the outer cylindrical surface of the dielectric rectangular tubing 136, which conducting wires 137 and 138 are respectively disposed in two parallel helical grooves 139 and 140. A plurality of pairs of reed switches 141, 142, 143, etc. are disposed at regular intervals following the two conducting wires and secured thereto. The return connection wires 144 and 145 are routed in holes disposed axially through the wall of the dielectric rectangular tubing 136. The dielectric rectangular tubing 136 is enclosed within a sealed rectangular tubular container 146 that engages the rectangular hole disposed through the magnetized float (not shown).

In FIG. 12 there is illustrated a cross section of yet another embodiment of the transducer rod taken along a plane parallel to the central axis thereof, which illustrates an alternative method for routing the conducting wire employed in the construction of a transducer rod. In the embodiment illustrated in FIG. 11, the pair of the conducting wires 137 and 138 are disposed in two parallel helical pattern following the lengthwise direction of the transducer rod. It is clear that the same end-result can be obtained by routing the two conducting wires in a zig-zag pattern following the faces of two opposite side walls of the dielectric rectangular tube 147 having essentially the same construction as the element 136 shown in FIG. 11. One of the two conducting wires 148 is disposed in a shallow groove of zig-zag pattern formed in one outer side surface of the dielectric rectangular tube 147 enclosed within a sealed rectangular tubular container 149. The plurality of the reed switches 150, 151, 152, 153, 154, etc. anchored to the bottom of the zig-zagging groove and extending inwardly through the wall of the dielectric rectangular tubing 149 as shown in FIG. 11 are in electrical contact with the conducting wire 148. The combination of the other conducting wire and the plurality of the reed switches in contact therewith is disposed in a mirror image to the combination including the conducting wire 148 and the reed switches in contact therewith.

In FIG. 13 there is illustrated a cross section of yet a further embodiment of the transducer rod operating on essentially the same principles as those described in conjunction with FIG. 8, which cross section is taken along a plane perpendicular to the length of the transducer rod. The transducer rod 155 comprises a high ohmic resistance wire 156 coaxially disposed within an electrically conducting tube 157 having an elastic thin wall. The high ohmic resistance wire 156 includes a plurality of electrically conducting discs 158 disposed at regualr intervals and separated from each other by a plurality of dielectric spacer rods 159. The high ohmic resistance wire 156 is routed through holes centrally disposed through the conducting discs 158 and the spacers 159. The electrically conducting tube 157 includes a plurality of leaf spring switches 160, 161, 162, 163, 164, 165, etc. anchored thereto and radially extending inwardly. The plurality of the leaf spring switches are disposed at regular intervals wherein each of the leaf spring switches extends into space intermediate each pair of adjacent conducting discs. The operating principles of the embodiment shown in FIG. 13 is essentially same as those described in conjunction with FIG. 5. The return connection wire 169 of FIG. 13 plays the same role as that of the element 66 shown in FIG. 5. The thin walled conducting tube 157 is insulated by a dielectric tubular liner 160. The transducer rod assembly is enclosed within a sealed tubular container 167 including at least one guide key 168 that prevents the rotating movement of the magnetized float such as the element 111 of FIG. 1 relative to the transducer rod 155, which magnetized float is engaged by the transducer rod in a sliding relationship.

In FIG. 14 there is illustrated another cross section of the transducer rod 155 shown in FIG. 13 taken along plane 14—14 including the central axis of the transducer rod as shown in FIG. 13. In this cross section, the combination including the high ohmic resistance wire 156 and the plurality of the conducting discs 158 and the spacer rods 159 disposed concentrically within the thin walled conducting tube 157 including a plurality of the leaf spring switches 160, 161, etc. is clearly illustrated. The centering discs 170 and 171 made of dielectric material are employed to dispose the conducting wire 156 in a concentric position within the thin walled conducting tube 157. In this particular embodiment, the leaf spring switches 160, 161, etc. are constructed by cutting portions of the elastic thin wall of the electrically conducting tube 157 into the shape of the leaf spring switch and bending them toward the central axis of the electrically conducting tube 157. The insulating dielectric tube 166 shown in FIG. 13 may be eliminated when the sealed tubular container 167 housing the assembly of the transducer rod 155 is made of a dielectric material. Of course, the conducting discs and the leaf spring switches must be made of a magnetically permeating material such as paramagnetic or ferromagnetic material, whereby the leaf spring switches become attracted to the conducting discs and thus establish a localized electrically conducting contact between the high ohmic resistance wire 156 and the conducting tube 157, when those elements are within the path of the magnetic flux generated by the magnetized float.

While the principles of the present invention have now been made clear by the illustrative embodiments, it will be immediately obvious to those skilled in the art many modifications of the structures, elements, arrangements, proportions and materials which are particularly adapted to the specific working environments and operating conditions in the practice of the invention without departing from those principles. It is not desired to limit the invention to the particular illustrated embodiments shown and described and, accordingly, all suitable modifications and equivalents may be resorted to falling within the scope of the invention as defined by the claims which follow.

The embodiments of the invention in which an exclusive property or priviledge is claimed are defined as follows:

1. An apparatus for detecting position comprising in combination:

(a) an elongated tubular container;

(b) a first elongated electrically conducting member disposed within the elongated tubular container intermediate first and second extremities of the elongated tubular container in a fluidic vessel;

(c) a second elongated electrically conducting member disposed within the elongated tubular container intermediate said first and second extremities of the elongated tubular container, wherein at least one of the first and second elongated electrically conducting members has a high specific ohmic resistance;

(d) a plurality of normally open switches disposed pivotally in groove means in an elongated dielectric within the elongated tubular container at regular intervals intermediate said first and second extremities of the elongated tubular container, each of said plurality of normally open switches providing electrical connection between said first and second elongated electrically conducting member when said normally open switch is closed; wherein the earth's gravitational pull acting on the normally open switch keeps the normally open switch at open position in the absence of a magnetic force field, and a magnetic force field generally perpendicular to the lengthwise direction of the elongated tubular container closes the normally open switch and thus establishes electrical connection between said first and second elongated electrically conducting members;

(e) a marker guided by the elongated tubular container in a sliding floating relationship wherein said marker slidable over a distance intermediate said first and second extremities of the elongated tubular container indicate positions to be detected, said marker including at least one magnet producing a magnetic force field generally perpendicular to the lengthwise direction of the elongated tubular container;

(f) means for measuring ohmic resistance of first electrical circuit comprising first portions of said first and second elongated electrically conducting members intermediate first extremities of said first and second elongated electrically conducting members and said marker, and one or more of the normally open switches closed by the magnetic force field produced by said marker; and for measuring ohmic resistance of second electrical circuit comprising second portions of said first and second elongated electrically conducting members intermediate second extremities of said first and second elongated electrically conducting members and said marker, and said one or more of the normally open switches closed by the magnetic force field produced by said marker; and (g) means for converting values of ohmic resistances of said first and second electrical circuits into information on position of said marker wherein conversion from said values of ohmic resitances to said information on position is independent of ohmic resistance contributed by said one or more of the normally open switches closed by the magnetic force field produced by said marker.

2. The combination as set forth in claim 1 wherein said elongated tubular member is sealed in a leak-proof manner and said marker is a float floating at the free surface of a liquid medium.

3. The combination as set forth in claim 2 wherein said combination includes at least one means disposed at one extremity of said elongated tubular member for securing said elongated tubular container to the wall of a vessel holding the liquid medium in a vertical position.

4. An apparatus for detecting position comprising in combination:
   (a) an elongated tubular container in a fluidic vessel;
   (b) a first elongated electrically conducting member disposed within the elongated tubular container intermediate first and second extremities of the elongated tubular container;
   (c) a second elongated electrically conducting member disposed within the elongated tubular container intermediate said first and second extremities of the elongated tubular container, wherein at least one of the first and second elongated electrically conducting members has a high specific ohmic resistance;
   (d) a plurality of normally open switches disposed within the elongated tubular container at regular intervals intermediate said first and second extremities of the elongated tubular container, each of said plurality of normally open switches providing electrical connection between said first and second elongated electrically conducting members when said normally open switch is closed; wherein mechanical spring force included in the normally open switch keeps the normally open switch at open position in the absence of a magnetic force field and a magnetic force field generally perpendicular to the lengthwise direction of the elongated tubular container closes the normally open switch and thus establishes electrical connection between said first and second elongated electrically conducting members;
   (e) a floating marker coacting with the elongated tubular container in a sliding relationship wherein said marker slidable over a distance intermediate said first and second extremities of the elongated tubular container to indicate positions to be detected, said marker including at least one magnet producing a magnetic force field generally perpendicular to the lengthwise direction of the elongated tubular container;
   (f) means for measuring ohmic resistance of first electrical circuit comprising first portions of said first and second elongated electrically conducting members intermediate first extremities of said first and second elongated electrically conducting members and said marker, and one or more of the normally open switches closed by the magnetic force field produced by said marker; and for measuring ohmic resistance of second electrical circuit comprising second portions of said first and second elongated electrically conducting members intermediate second extremities of said first and second elongated electrically conducting members and said marker, and said one or more of the normally open switches closed by the magnetic force field produced by said marker; and
   (g) means for converting values of ohmic resistance of said first and second electrical circuits into information on position of said marker wherein conversion from said values of ohmic resistances to said information on position is independent of ohmic resistance contributed by said one or more of the normally open switches closed by the magnetic force field produced by said marker.

5. The combination as set forth in claim 4 wherein said elongated tubular member is sealed in a leak-proof manner and said marker is a float floating at the free surface of a liquid medium.

6. The combination as set forth in claim 5 wherein said combination includes at least one means disposed at one extremity of said elongated tubular member for securing said elongated tubular container to the wall of a vessel holding the liquid medium in a vertical position.

* * * * *